Oct. 11, 1927.

H. M. TUNSTALL

TONGS

Filed Oct. 30, 1926

1,645,509

INVENTOR.
Harry M. Tunstall
BY
Hardway Cathey
ATTORNEYS

Patented Oct. 11, 1927.

1,645,509

UNITED STATES PATENT OFFICE.

HARRY M. TUNSTALL, OF CORPUS CHRISTI, TEXAS.

TONGS.

Application filed October 30, 1926. Serial No. 145,218.

This invention relates to new and useful improvements in tongs.

One object of the invention is to provide a device of the character described specially designed for the purpose of engaging the rim of the sack-like filter, or strainer of a coffee urn for removing or replacing said filter.

Another object of the invention is to provide an implement of the character described which is of very simple construction and may be cheaply produced and is very convenient in use.

With the above and other objects in view the invention has particular relation to certain novel features of construction, operation and arrangement of parts, an example of which is given in this specification and illustrated in the accompanying drawings, wherein:—

Figure 1:
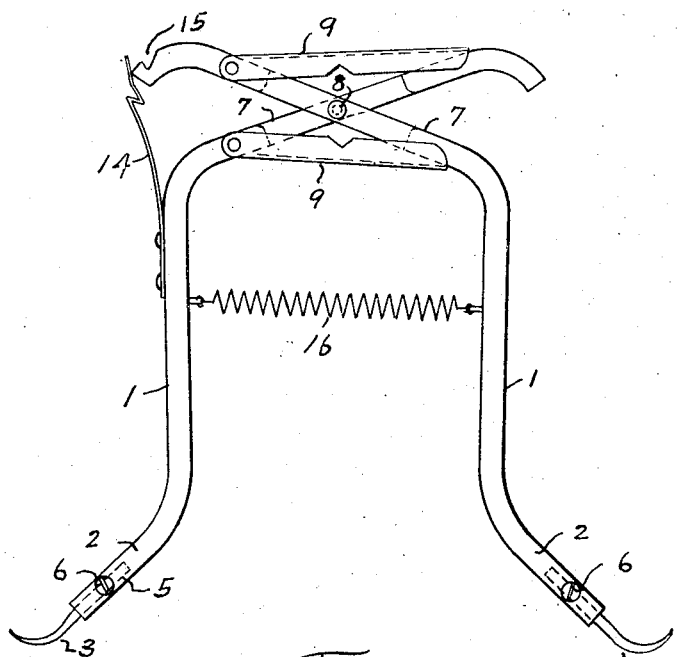
Figure 1 shows a side elevation of the tongs.
Figure 2:
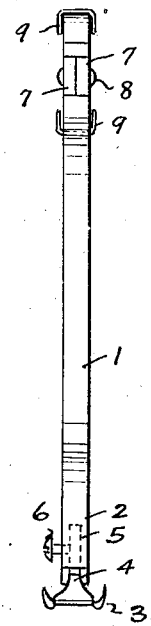
Figure 2 shows an edge view thereof.
Figure 3:
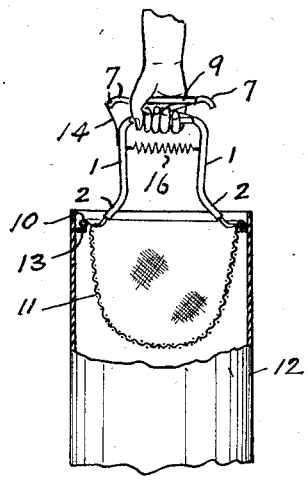
Figure 3 shows a side elevation of the implement, as applied in use.

Referring now more particularly to the drawings, wherein like numerals of reference designate similar parts in each of the figures, the numerals 1, 1, designate the side arms of the tong, whose free ends are outwardly turned as at 2, 2 so as to diverge from each other and these outwardly turned ends carry the forked prongs, or hooks, 3, 3, whose shanks 4 are fitted into the sockets 5 of said ends 2 and are secured therein by means of set bolts 6 so as to be readily adjustable. The other ends 7, 7, of said arms 1, 1, are inwardly turned and cross each other and are pivotally connected together by the pivot pin 8. Two grip members 9, 9, are provided which are preferably formed of sheet metal and are U-shaped in cross section. Each grip member 9 is pivoted at one end to one of the overturned ends 7 and its other end forms a bearing which receives the other overturned end 7. When the grip members 9 are grasped, as illustrated in Figure 3, and gripped together it will operate to spread the hooks 3, 3, apart and these hooks may be engaged under the rim 10 of the sack-like strainer 11 of the coffee urn 12. This rim 10 is rigid and normally rests on the ledge 13 of said urn.

The strainer, in use, is filled with ground coffee and when the coffee has been thoroughly filtered the strainer is to be lifted out and emptied but usually being very hot this is difficult to do without some implement provided for that purpose and it is for the purpose indicated that the tong herein described has been designed.

A spring dog 14 is secured to one of the arms 1 and is adapted to engage in the notch 15 formed in the free end of the overturned portion 7, of the other arm, so as to secure the hooks 3 in engagement under the rim 10. When the grip members 9 are released and the dog 14 disengaged the hooks 3 will be automatically released from the rim 10 by the pull spring 16 which connects the arms 1.

What I claim is:—

1. An implement of the character described including side arms, engaging means at one end of each arm, the other ends of said arms being inwardly turned and pivoted together a grip member carried by the inwardly turned end of each arm and operable against the other arm.

2. An implement of the character described including side arms, engaging means at one end of each arm, the other ends of said arms being inwardly turned and pivoted together, grip members, one end of each grip member being pivoted to one of said overturned ends and having a bearing on the other overturned end.

3. An implement of the character described including a pair of side arms, each being overturned at one end, said overturned ends being pivoted together, adjustable engaging means carried by the other ends of said arms and a grip member pivoted to the inwardly turned end of each arm and bearing against the other arm.

4. An implement of the character described including side arms having overturned ends which cross each other and are pivoted together, engaging means carried by the other ends of said arms, a pair of grip members, each grip member being pivoted at one end to one of said overturned ends and having a bearing on the other overturned end.

5. An implement of the character described including side arms, engaging means at one end of each arm, the other ends of said arm being inwardly turned and pivoted together, grip members, one end of each grip member being pivoted to one overturned end and bearing against the other overturned end and interengaging means carried by one of said arms and the inwardly turned end of the other arm.

In testimony whereof I have signed my name to this specification.

HARRY M. TUNSTALL.